Sept. 20, 1971    D. R. FLEMING ET AL    3,606,060

MATERIAL HANDLING VEHICLE

Filed Nov. 28, 1969    4 Sheets-Sheet 1

INVENTORS.
DAVID R. FLEMING
EDWARD H. JACOBSEN

BY George C. Sullivan
Agent
Robert B. Kennedy
Attorney

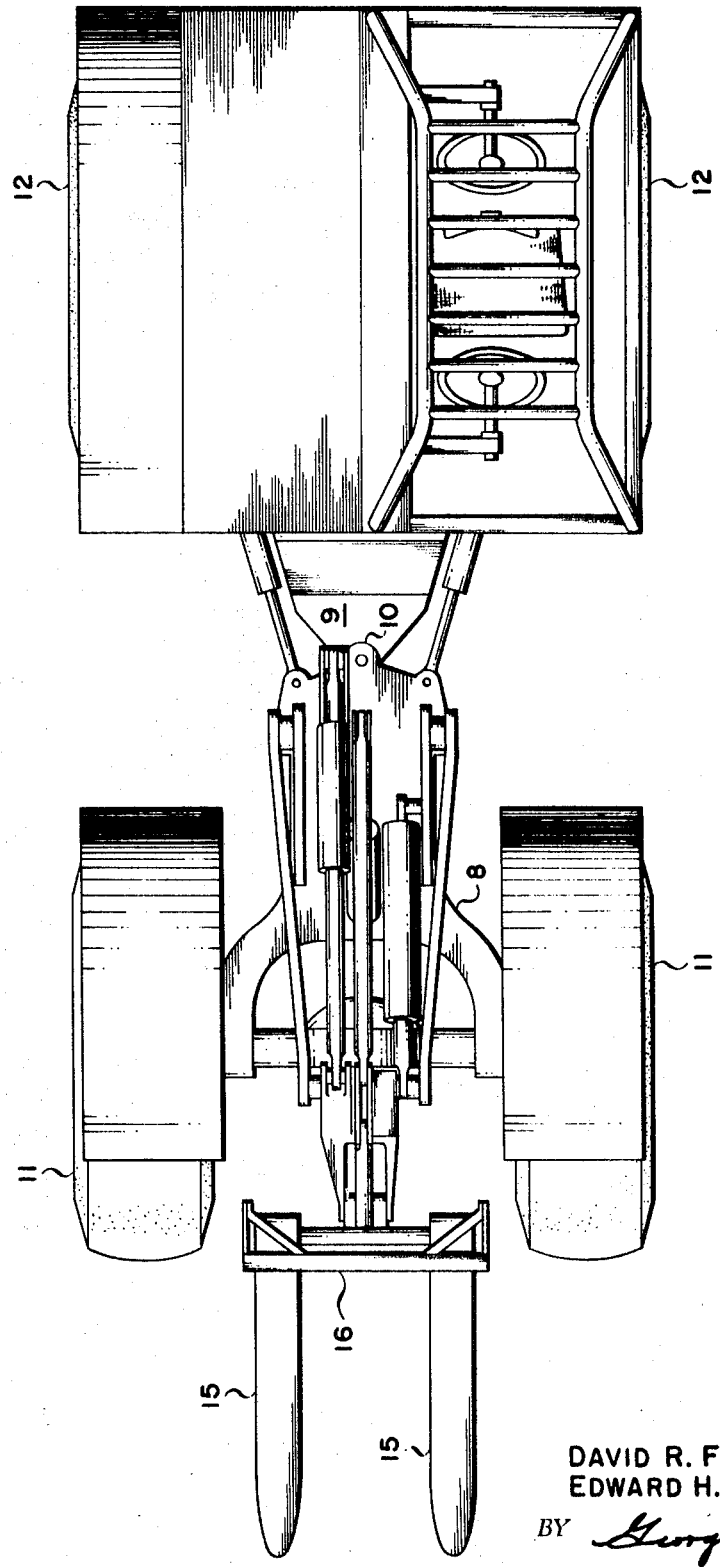

Sept. 20, 1971  D. R. FLEMING ET AL  3,606,060
MATERIAL HANDLING VEHICLE
Filed Nov. 28, 1969  4 Sheets-Sheet 3

INVENTORS.
DAVID R. FLEMING
EDWARD H. JACOBSEN
BY George C. Sullivan
Agent
Robert B. Kennedy
Attorney Sept. 20, 1971  D. R. FLEMING ET AL  3,606,060
MATERIAL HANDLING VEHICLE Filed Nov. 28, 1969  4 Sheets-Sheet 4

INVENTORS.
DAVID R. FLEMING
EDWARD H. JACOBSEN
BY *George C. Sullivan*
Agent
*Robert B. Kennedy*
Attorney

United States Patent Office 3,606,060
Patented Sept. 20, 1971

3,606,060
MATERIAL HANDLING VEHICLE
David R. Fleming, Mountain View, and Edward H. Jacobsen, Menlo Park, Calif., assignors to Lockheed Aircraft Corporation, Burbank, Calif.
Filed Nov. 28, 1969, Ser. No. 880,638
Int. Cl. B66f 9/00
U.S. Cl. 214—771                    3 Claims

ABSTRACT OF THE DISCLOSURE

A material handling vehicle adapted for rough terrain operations having pantographic linkage means for lifting a load from the terrain and for positioning the load over the vehicle chassis for transport.

BACKGROUND OF THE INVENTION

This invention relates generally to material handling vehicles, and particularly to material handling vehicles adapted to lift, lower and transport loads over rough terrain.

Material handling vehicles, such as forklift trucks, are usually built to operate over relatively smooth, hard surfaces. This fact reduces the importance associated with loaded weight distribution.

Such vehicles can be ballasted to place their centers of gravity well withtin the limits of reasonable stability whenever the loaded vehicles are substantially level. This is usually accomplished by locating the engine and other counterweights over the rear wheel axle to counterbalance the weight on the front wheel axle imposed by any load on the load carriage which is located in front of the front wheel axle. Though appropriate for generally smooth and level surface operations, this design technique is of limited use in providing sound weight distribution in material handling vehicles adapted for rough terrain and steep grade operations.

Forklift trucks have heretofore been devised for rough terrain operations. U.S. Pat. 3,155,251, for example, a forklift truck is disclosed comprising a longitudinally extending loader mechanism having an upright structure which may be moved on rollers longitudinally of the truck chassis. In U.S. Pat. 3,001,654 another material handling vehicle of the forklift type is disclosed having means for retracting the fork-carriage for greater stability during transport. The rollable loading mechanism of the former patent provides structure of which at least a portion remains longitudinally extended even when the load carriage is in a retracted position which negates compactness in a transport mode and which obstructs the operators view of the terrain just ahead of the vehicle wheel. In addition the track and roller assembly may be dirtied or muddied during rough terrain operations and thereby lose mechanical efficiency. In the latter case the longitudinal travel of the forks is so short as not to provide means for positioning the load carriage over or within the body of the vehicle proper. This limits the degree of stability provided for the transport mode of operation.

A principle object of the present invention is to provide an improved material handling vehicle adapted for rough terrain operations.

More specifically, it is an object of the present invention to provide a lift and carry vehicle, such as a forklift truck, having a load transport mode of operation with substantally equal gross vehicle load weight distribution on the vehicle wheels or treads, Another object of the invention is to provide a forklift truck having high mobility in its load-carrying mode of operation over a wide range of soil and terrain conditions.

Other objects of the invention include providing a forklift truck having improved operator visability in both loading and transport modes of operation, and improved loaded speed capability, stability, safety, maintainability, vehicle life, overload capacity and lifetime cost.

SUMMARY OF THE INVENTION

Briefly described, the present invention is a material handling vehicle comprising a chassis and ground engaging means such as wheels or treads which define an outboard ground contact line oriented substantially normal to the direction of travel the ground engaging means is adapted to move over the ground. The vehicle further includes a loading mechanism having pantographic linkage pivotably mounted to the frame, a load carriage connected to the loading mechanism, and hydraulic means operably coupled to the loading mechanism for lifting and lowering the load carriage and for positioning at least a portion of the load carriage on each side of the outboard ground contact line. In a preferred embodiment of the invention the loading mechanism comprises a bell crank lever, 1st and 2nd spacially-separated booms pivotably mounted to the bell crank lever and to the chassis, and 1st and 2nd spacially-separated extension arms pivoted to the bell crank lever and to the load carriage.

BRIEF DESCRIPTION OF THE DRAWING

FIG. 2 is a plan view of the forklift truck shown in FIG. 1.

DESCRIPTION OF THE PREFERRED EMBODIMENTS

Figure 1:
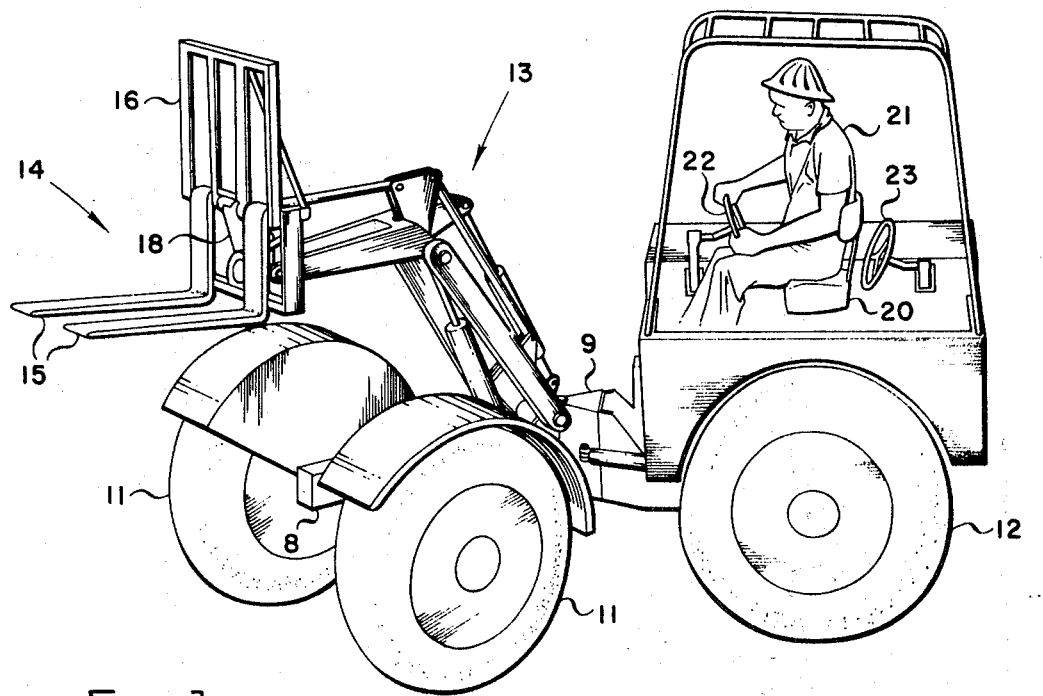
FIG. 1 is a perspective view of a forklift truck adapted for rough terrain operations which incorporates principles of the present invention.

Referring now in more detail to the drawing, which is made substantially to scale, there is illustrated in FIGS. 1 and 2 a forklift truck made in accordance with principles of the present invention and comprising a chassis on which are rotatably mounted front and rear wheels 11 and 12, respectively. The vehicle chassis includes front and rear frame members 8 and 9 which are pivotably joined together by an articulation joint 10. The articulation joint, which may be of the type described in detail in U.S. Pat. No. 3,414,072, allows the front frame member 8 two degrees of movements with respect to rear frame member 9, namely that of roll about the longitudinal axis of the vehicle and yaw about the vertical axis of the articulation joint.

One end of loading mechanism 13 is pivotably mounted to front frame member 8 adjacent articulation joint 10. The other end of the loading mechanism is pivoted to a load carriage 14 which includes two spaced, parallel fork tines 15 and a backrest 16. A load carriage roll cylinder 18 is pivoted to the backrest and loading mechanism. The vehicle operator's seat 20 is located above the rear wheel axle. Seat 20 is swiveled enabling vehicle operator 21 to face or to face away from load carriage 14. Two vehicle steering wheels 22 and 23 are located on each side of swivel seat 20. With this configuration operator 21 may face load carriage 14 in operating it, and, when loaded, turn about face in order to drive the vehicle with a view unobstructed by the load.

Figure 3C:
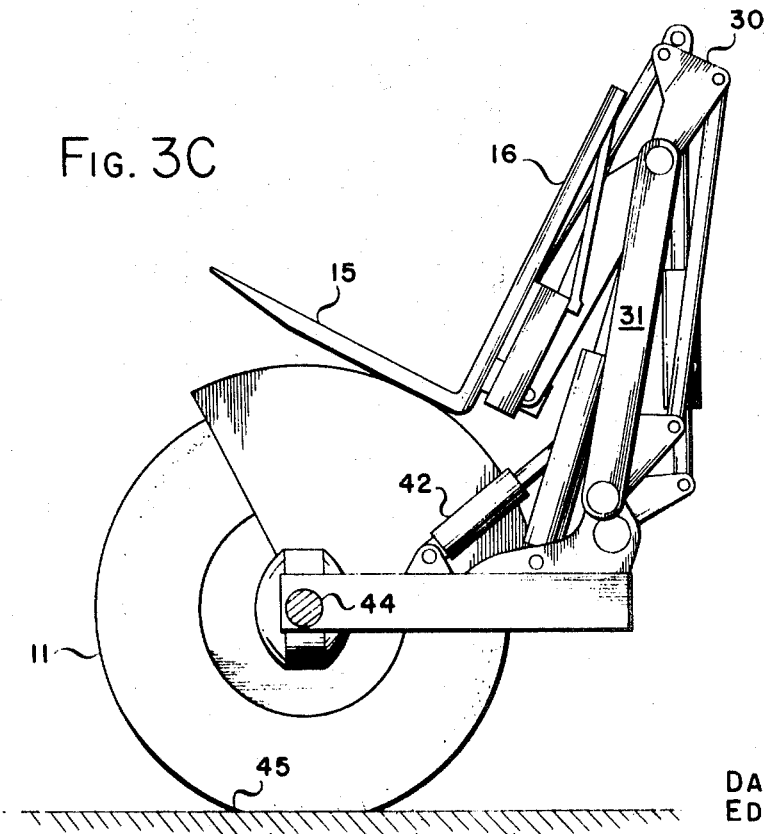
FIG. 3C is another fragmentary view of the forklift truck as shown in FIG. 2 with the load carriage in a retracted, lowered position.
Figure 3A:
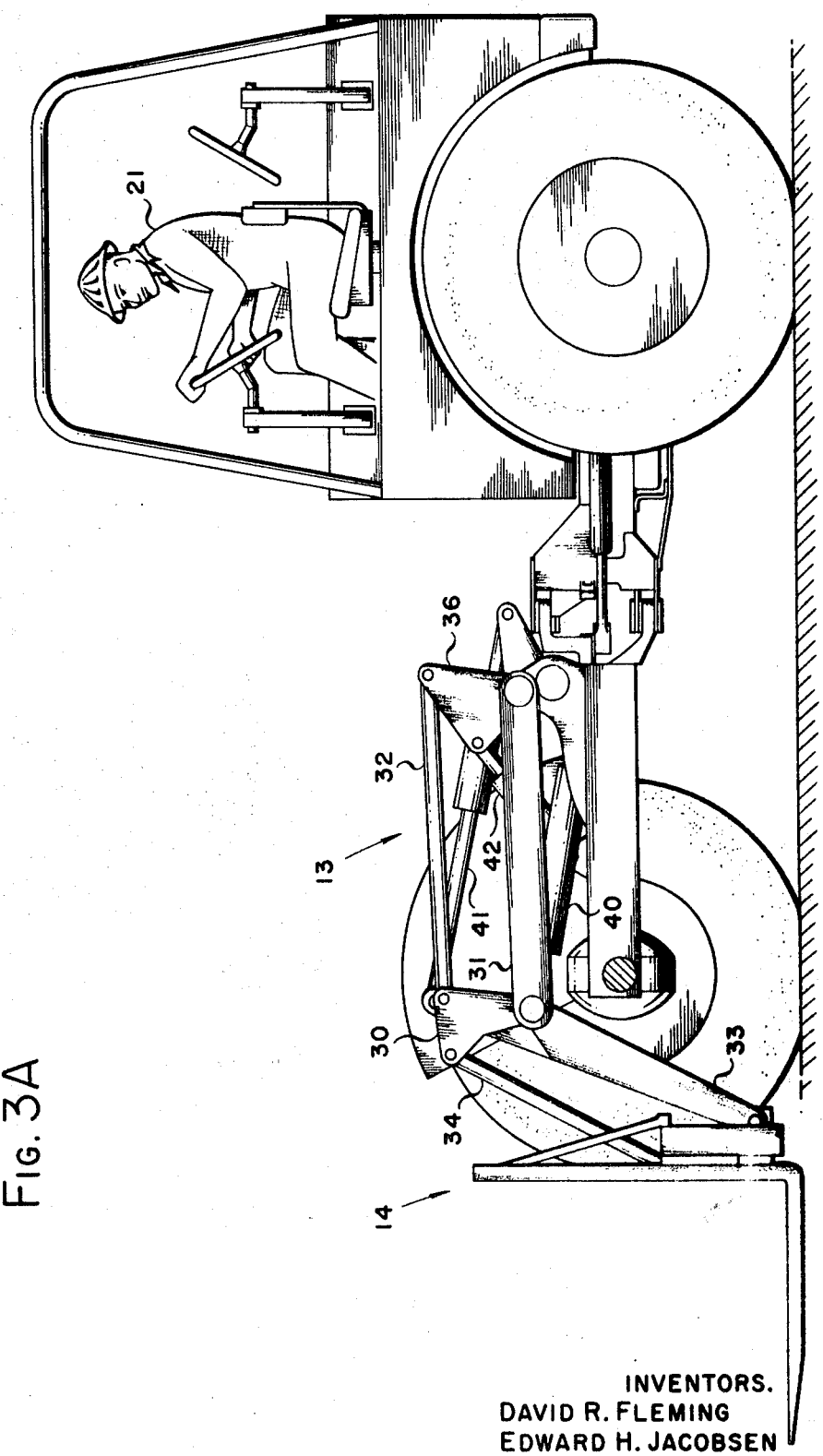
FIG. 3A is a profile view in elevation of the forklift truck shown in FIG. 1 with the load carriage in an extended, lowered position.

Referring now to FIG. 3A, the loading mechanism 13 is seen to be pantographic and comprise a bell crank lever 30 to which is pivoted lower boom 31, upper boom 32, lower extension arm 33 and upper extension arm 34. The extension arms are also pivoted to load carriage 14. Boom 32 is pivoted to bell crank 36 which is pivotably mounted to frame member 8; boom 31 is pivoted directly to this frame member. A hydraulic boom cylinder 40 is pivotably mounted to frame member 8 and to bell crank 30 coaxially its pivot axis with boom 31. A hydraulic extension cylinder 41 is also pivoted to this frame member and to an end of extension arm 33. A load carriage hydraulic tilt cylinder 42 is pivotably mounted to frame member 8 and to bell crank 36.

Figure 3B:
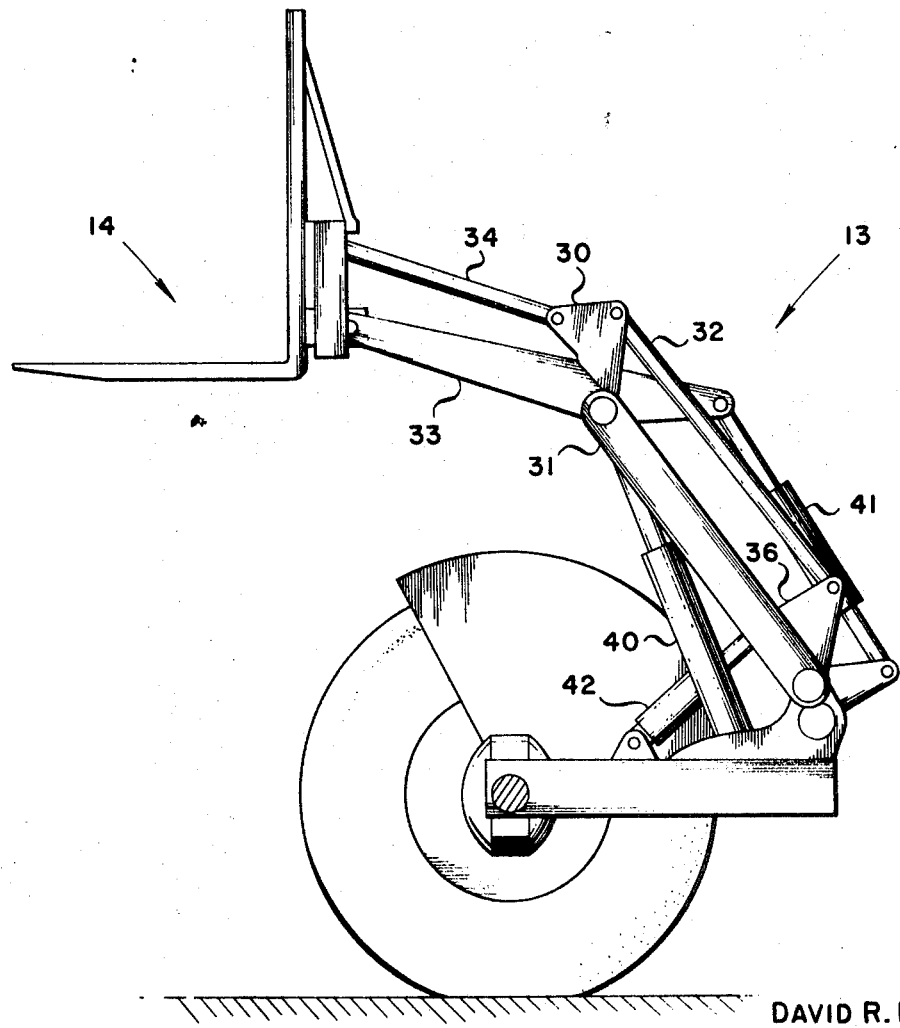
FIG. 3B is a fragmentary view of the forklift truck as shown in FIG. 2 with the load carriage in an extended, raised position.

FIG. 3B illustrates loading mechanism 13 and load carriage 14 in an extended, raised position; FIG. 3C shows the loading mechanism in a folded position. In the folded position most of the load carriage is positioned inboard of front wheel axle 44 with substantially all of the carriage located inboard of outboard ground contact line 45 of wheels 11. During certain periods of translating to and from the positions of FIGS. 3A and 3C boom cylinder 40 and extension cyliner 41 interchange lift and extension functions. However, for the sake of clarity their nomenclature has herein been fixed to that of one principle function.

Note from the drawing that lower boom 31 is parallel to and substantially of the same length, as measured between pivot points, as that of upper boom 32. This same relative relationship likewise exists for extensions arms 33 and 34. Consequently, booms 31 and 32 and bell cranks 30 and 36 form parallelogrammic linkage pivoted to frame 8. Likewise, extension arms 33 and 34, bell crank lever 30 and load carriage 14 form parallelogrammic linkage. This configuration enables load carriage 14 to be raised and lowered between the positions shown in FIGS. 3A and 3B and brought behind ground contact line 45 by the sole operation of boom cylinder 40 and extension cylinder 41 without tilting of the carriage. Once behind ground contact line 45 the carriage may be tilted by tilt cylinder 42 to the position shown in FIG. 3C to prevent a load from sliding off fork tines 15 during rough terrain transit. Once in the transportation mode position of FIG. 3C, operator 21 may swivel his chair and drive the vehicle off to the right in the drawing with his view unobstructed by the load.

With loading mechanism 13 in the transport mode position of FIG. 3C the center of gravity of a load nestled upon load carriage 14 will be longitudinally inboard of wheel axle 44. With a capacity load of approximately half that of the vehicle itself in the transport mode position, the gross vehicle weight will be equally distributed on the four vehicle wheels. This, of course, renders the loaded vehicle quite stable, maximizes safety during rough terrain transit, enables the vehicle to traverse relatively soft terrain and tends to reduce maintenance requirements. Conversely, the capability of moving the load longitudinally a substantial distance, coupled with the reversable drive mode, provides a high degree of mobility to the vehicle ascending and descending slopes of relatively high grade since the center of gravity of the load and of the loaded vehicle can be shifted substantially.

It should be understood that the embodiment just described is merely illustrative of principles of the invention. Obviously, many modifications may be made in this particular embodiment without departing from the spirit and scope of the invention as set forth in the following claims.

We claim the following:

1. In a material handling vehicle having a chassis, a wheel axle and a load carriage,
    a loading mechanism for lifting and lowering said load carriage and for positioning at least a portion of said load carriage in front of and behind said wheel axle,
    said loading mechanism comprising a bell crank lever, 1st and 2nd spacially-separated booms pivoted to said bell crank lever and to said chassis, 1st and 2nd spacially-separated extension arms pivoted to said bell crank lever and to said load carriage, and hydraulic power means operably connected to said loading mechanism,
    said loading mechanism being retractable from an extended position by said hydraulic power means to a folded load carrying position in which folded position at least a portion of said load carriage is located behind said wheel axle, and
    tilting means for tilting said load carriage including a 2nd bell crank pivoted to said chassis and a tilting cylinder pivoted to said 2nd bell crank and to said chassis wherein said 1st boom, said 2nd boom, said bell crank lever and said 2nd bell crank form parallelogrammatic linkage.

2. In a material handling vehicle having a chassis, a wheel axle and a load carriage,
    a loading mechanism for lifting and lowering said load carriage and for positioning at least a portion of said load carriage in front of and behind said wheel axle,
    said loading mechanism comprising a pantographic linkage of a bell crank lever, 1st and 2nd spacially-separated booms pivoted to said bell crank lever and to said chassis, and 1st and 2nd spacially-separated extension arms pivoted to said bell crank lever and to said load carriage,
    hydraulic power means operably connected to said loading mechanism,
    said loading mechanism being retractable from an extended position by said hydraulic power means to a folded load carrying position in which folded position substantially all of said load carriage is located inside said wheel axle and over and within said vehicle chassis for stable load transporting,
    and tilting means for tilting said load carriage by adjustment of said pantographic linkage comprising a hydraulic tilting cylinder operatively connected to said load carriage through a linkage formed by said 1st boom, said bell crank lever and said 1st extension arm.

3. In a material handling vehicle having a first chassis, a second chassis, an articulation joint pivotally interconnecting said first and second chassis centrally of said vehicle, supporting wheel axles on said first and second chassis spaced from said articulation joint, and a load carriage; the improvement comprising:
    a loading mechanism for lifting and lowering said load carriage and for retracting said load carriage from outside to inside of said wheel axles on said vehicle,
    said loading mechanism comprising a pantographic linkage connecting between said first chassis and said load carriage,
    said pantographic linkage being pivotally connected to said first chassis adjacent said articulation joint,
    said pantographic linkage operating to provide a desired orientation of said load carriage during said retractable movement of said loading mechanism,
    hydraulic power means operably connected to said pantographic linkage,
    said pantographic linkage being retractable by said hydraulic power means to a fully folded load carrying position adjacent said articulation joint centrally of said vehicle,
    said load carriage in said load carrying position being substantially entirely located inside said wheel axle of said first chassis and over and within said first chassis to provide substantially equal gross vehicle load weight distribution on said supporting wheel axles, and tilting means for tilting said load carriage by adjustment of said pantographic linkage and providing for said fully folded position of said pantographic linkage comprising a hydraulic tilting cylinder connected to said pantographic linkage and operatively connected indirectly to said load carriage through said pantographic linkage.

References Cited

UNITED STATES PATENTS

| | | | |
|---|---|---|---|
| 2,853,200 | 9/1958 | Beyerstedt | 214—775 |
| 3,079,020 | 2/1963 | Gustine | 214—147G |
| 3,221,909 | 12/1965 | Magnuson | 214—147 |
| 3,522,898 | 8/1970 | Rotheisler | 214—773 |

GERALD M. FORLENZA, Primary Examiner

J. M. FORSBERG, Assistant Examiner

U.S. Cl. X.R.

214—773